United States Patent
Womack et al.

(10) Patent No.: US 7,397,775 B2
(45) Date of Patent: Jul. 8, 2008

(54) METHOD AND APPARATUS FOR ROUTING CALLS

(75) Inventors: James E. Womack, Bedford, TX (US); Jheroen P. Dorenbosch, Paradise, TX (US); Niranjan N. Segal, Arlington, TX (US)

(73) Assignee: Motorola, Inc., Schaumburg, IL (US)

( * ) Notice: Subject to any disclaimer, the term of this patent is extended or adjusted under 35 U.S.C. 154(b) by 495 days.

(21) Appl. No.: 10/967,571

(22) Filed: Oct. 18, 2004

(65) Prior Publication Data
US 2006/0083193 A1    Apr. 20, 2006

(51) Int. Cl.
*H04Q 7/00* (2006.01)
(52) U.S. Cl. .................. 370/328; 370/352; 370/466; 455/441; 455/445; 455/436
(58) Field of Classification Search .............. 370/328, 370/466, 352; 455/441, 445, 436
See application file for complete search history.

(56) References Cited

U.S. PATENT DOCUMENTS

| | | |
|---|---|---|
| 6,785,229 B1 | 8/2004 | McNiff et al. |
| 2004/0100923 A1* | 5/2004 | Yam .......................... 370/328 |
| 2005/0047435 A1* | 3/2005 | Segal et al. ................. 370/466 |
| 2005/0048972 A1* | 3/2005 | Dorenbosch et al. ........ 455/436 |
| 2005/0048977 A1* | 3/2005 | Dorenbosch et al. ........ 455/441 |
| 2005/0083874 A1* | 4/2005 | Guo et al. ................... 370/328 |
| 2005/0107086 A1* | 5/2005 | Tell et al. .................... 455/445 |
| 2005/0226174 A1* | 10/2005 | Kiss ........................... 370/282 |
| 2006/0045069 A1* | 3/2006 | Zehavi et al. ............... 370/352 |
| 2007/0082671 A1* | 4/2007 | Feng et al. .................. 455/436 |

\* cited by examiner

*Primary Examiner*—David Q Nguyen

(57) ABSTRACT

A communication unit (CU) (109, 111) network controller (113) and corresponding methods (603-609) are described that facilitate selectively routing calls. The CU includes a transceiver (403) suitable to support an air interface with a local area network (LAN) (101) and with a wide area network (WAN) (105) and a controller (405) that is coupled to and controlling the transceiver. These are each and collectively configured to determine when a bearer leg within the WLAN will not support a call attempt over the bearer leg and responsive to so determining, initiate the call over another bearer leg, e.g. within the LAN or the WAN. The determining includes, for example, receiving a message (703, 707, 713) that indicates or implies that the call can not be supported.

12 Claims, 4 Drawing Sheets

METHOD AND APPARATUS FOR ROUTING CALLS

FIELD OF THE INVENTION

The present invention relates in general to wireless communication units and wireless networks, and more specifically to a method and apparatus for routing calls within such wireless networks.

BACKGROUND OF THE INVENTION

Local Area Networks (LANs) including wireless LANs are being contemplated or are known. Such LANs are typically supported by network controllers or LAN servers, which may alternatively be referred to as private branch exchanges (PBXs) or enterprise servers. The PBX normally provides a control and switching function for the LAN and communication units operating therein or users thereof. The LAN and wireless LAN can be an attractive and inexpensive alternative for typical voice services such as telephony or dispatch services and may provide additional amenities such as high-speed wireless Internet and Intranet access as well as other real-time applications that may be more specific to a given enterprise.

Wireless wide area networks (wireless WANs or WANs) such as conventional cellular telephone systems are also known. Such networks provide the advantage of wide area coverage but may not be economically attractive for routine access to wideband or high speed data capabilities, such as are required for certain Internet or Intranet applications.

A LAN including a wireless LAN will normally be able to support call loads. However, occasionally the LAN may experience problems and thus may not be able to properly support a call directed to or initiated by a communication unit operating in or on the LAN. Unfortunately in these circumstances the call may not be connected as intended or expected.

BRIEF DESCRIPTION OF THE DRAWINGS

The accompanying figures where like reference numerals refer to identical or functionally similar elements and which together with the detailed description below are incorporated in and form part of the specification, serve to further illustrate a preferred embodiment and to explain various principles and advantages in accordance with the present invention.

DETAILED DESCRIPTION OF THE PREFERRED EMBODIMENTS

Figure 1:
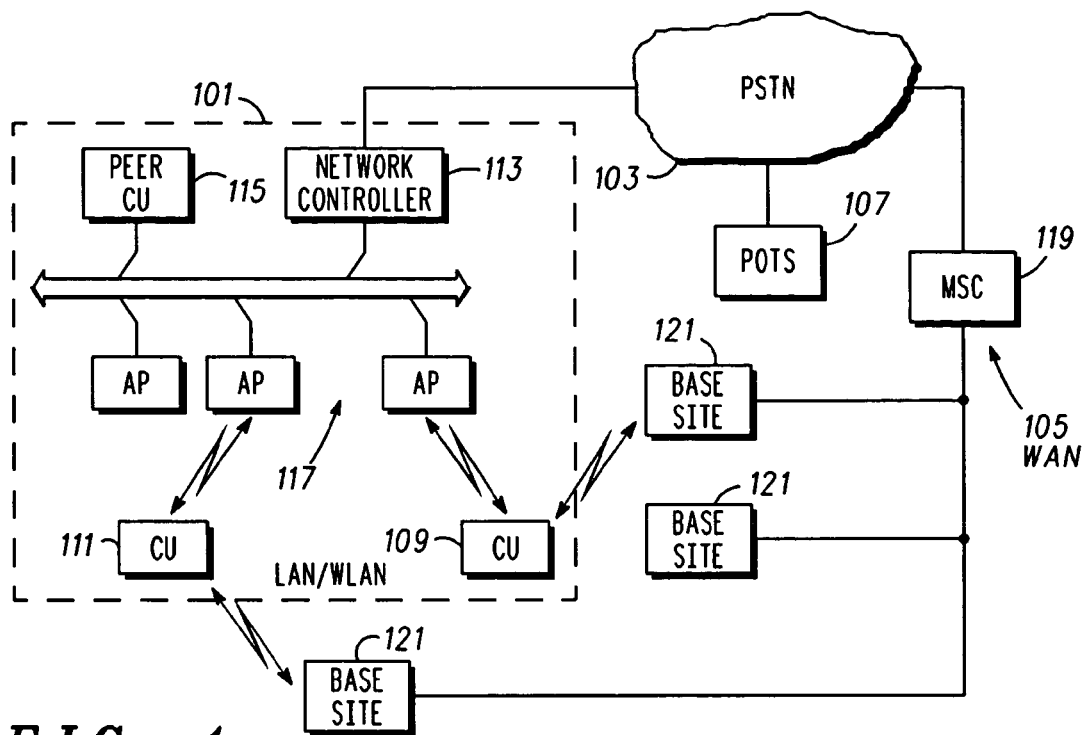
FIG. 1 depicts, in a simplified and representative form, an exemplary system diagram according to various embodiments where methods and apparatus for selective routing of a communication or call can be utilized.

In overview, the present disclosure concerns wireless communication devices or units, often referred to as communication units, such as cellular phone or two-way radios and the like and communication networks or systems that provide services such as voice and data communication services to or for such communication units. More particularly various inventive concepts and principles are embodied in systems or constituent elements, communication units, and methods therein for routing a call or communication for or from a communication unit via an alternative network or path when, for example, the intended network or path will not or does not have sufficient capacity or resources to support the call as initiated or expected.

Note that communication unit may be used interchangeably herein with subscriber device or unit and the like and each of these terms denotes a device ordinarily associated with a user and typically a wireless communication unit that may be used within a private or enterprise network or within a public network. Examples of such units include personal digital assistants, personal computers equipped for wireless operation, a cellular handset or device, or equivalents thereof provided such units are arranged and constructed for operation on either of the enterprise or public networks.

The communication systems and communication units that are of particular interest are those that may provide or facilitate voice communication services or data or messaging services over public networks such as cellular wide area networks (WANs), including analog and digital cellular, CDMA (code division multiple access) and variants thereof, GSM (Global System for Mobile communication), GPRS (General Packet Radio System), 2.5G and 3G systems such as UMTS (Universal Mobile Telecommunication Service) systems, integrated digital enhanced networks and variants or evolutions thereof.

Furthermore the wireless communication units or devices of interest are capable and suitable for operating on, for example enterprise or private networks, and have or facilitate short range wireless communication capability normally referred to as local area network (LAN) or wireless LAN capabilities. These networks often operate in accordance with technologies, such as IEEE 802.11, Bluetooth, or Hiper-Lan and the like that preferably utilize CDMA, frequency hopping, OFDM (orthogonal frequency division multiplexed) or TDMA (time division multiple access) access technologies and one or more of various networking protocols, such as TCP/IP (Transmission Control Protocol/Internet Protocol), UDP/IP (User Datagram Protocol/IP), IPX/SPX (Inter-Packet Exchange/Sequential Packet Exchange), Net BIOS (Network Basic Input Output System) or other protocol structures.

The instant disclosure is provided to further explain in an enabling fashion the best modes of performing one or more embodiments in accordance with the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms such as first and second, and the like, if any, are used solely to distinguish one from another entity, item, or action without necessarily requiring or implying any actual such relationship or order between such entities, items or actions.

Much of the inventive functionality and many of the inventive principles when implemented, are best supported with or in software or integrated circuits (ICs), such as a digital signal processors or general purpose processors and software therefore or application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions or ICs with minimal experimentation. Therefore, in the interest of brevity and minimization of any risk of obscuring the principles and concepts according to the present invention, further discussion of such software and ICs, if any, will be limited to the essentials with respect to the principles and concepts used by the exemplary embodiments.

Referring to FIG. 1, a simplified and representative environment or system diagram will be discussed and described where various inventive methods and apparatus for selective routing of a communication or call can be advantageously utilized. FIG. 1 illustrates a local area network (LAN) or wireless LAN 101 that is coupled to a conventional public network, such as the Internet or public switched telephone network (PSTN) 103 and thus a wide area network (WAN) 105 as well as a multiplicity of plain old telephone sets (POTS) 107 (one depicted). Further shown are a plurality of communication units or wireless communication units 109, 111 (two depicted). One or more of the plurality of communication units 109, 111 are arranged to and capable of communicating on either or both of the LAN or WAN as shown. Note that first and second networks may alternatively be used for the LAN and WAN, respectively in the following description. However in application of the principles and concepts herein described these networks may be interchanged, e.g. the first network could be a WAN and the second network a WLAN, or both could be WLANs, provided appropriate modifications are implemented as will be further noted.

The LAN 101 may be a generally known enterprise communication network that provides voice, typically voice over Internet Protocol (VoIP) and data services within or proximate to a geographic area including a business location such as a building or the like. The LAN 101 is or includes a wireless LAN and a network controller 113 or switching function that may alternatively be referred to as Private Branch Exchange (PBX), enterprise server, media gateway controller (MGC) and so on. The network controller provides overall control for the LAN and sets up and routes or couples (switches) communications or calls within the LAN and from/to the PSTN. For example calls from/to POTS 107 or the WAN or from/to communication units, such as communication unit 109, 111 or peer communications unit 115 (a fixed typically IP based telephone unit for example), are setup and routed or coupled to/from there destinations/sources. The LAN, specifically wireless LAN portion, includes as is generally known a plurality of access points 117 that support an air interface between the access points, i.e. the LAN or WLAN and the wireless communication units 109, 111 when these units are operating on the LAN.

The WAN 105 is generally known and is a wireless communications network, such as in one embodiment, a cellular packet data network or other cellular or cellular like network otherwise referred to as a cellular wide area network (cellular WAN) or simply WAN or the like that provides services, such as voice and data, over a large geographic area. The large geographic service area of the WAN overlaps at least in part the service area of the LAN. The WAN 105 includes a network controller or switching function 119, alternatively referred to as a mobile switching center or MSC. The MSC 119 as known provides overall control for the WAN and functionality similar to or analogous to the network controller 113 for the LAN. The MSC is coupled to a plurality of base sites or base stations 121 that support an air interface between the base stations and the wireless communication units 109, 111 when these units are operating on the WAN.

Also it will be appreciated that a large number of entities or functions that are part of typical networks are not specifically shown but understood to be present and operational. For example in the first network or LAN 101 typical network routing equipment such as servers, concentrators, routers, etc. may be present. The second network or WAN 105 similarly typically includes a plurality of antenna towers as well as base site controllers that all serve to provide a radio access network for communication units as well as various registrars, billing servers and so forth. Note that while the first and second networks 101, 105 may be referred to as wireless networks, much of these networks or the respective elements thereof are intercoupled using terrestrial based links using wires or circuits. For example, the switching functions or network controllers 113, 119 are normally coupled to the balance of their respective networks using ordinary cables, wires or the like. Furthermore the LAN 101 can include and support voice services (for example VoIP) for stationary or static communications units, such as peer unit 115 that are coupled to the network using conventional cabling or wires. Thus the discussions below will refer alternatively to the first communications network as a WLAN or LAN 101.

The LAN 101 and possibly WAN 105 in exemplary embodiments are packet data networks using packet switched methodologies. Furthermore the LAN utilizes some form of protocol for setting up sessions or connections with other units. Various known protocols can be used, such as H.323 defined and promulgated by the International Multimedia Telecommunication Consortium (IMTC) (see http://www.imtc.org/h323.htm and associated websites for descriptive documents) or Session Initiation Protocol (SIP) as defined by IETF in the RFC3261 document. Much of the discussion below, where relevant will assume that SIP and SIP constructs and entities are being utilized in the LAN or WLAN and that legacy cellular or dispatch protocols (this may include SIP) are being utilized in the WAN, where it is understood that similar functions and methods are available using other protocols if desired.

Generally the network switching function operates to establish a connection between wireless communication units within the WLAN, such as unit 109 and peer communication units, such as peer communication unit 115. Note that a connection between the wireless communication unit 109 and the access point is a packet data connection while connections via the PSTN and network controller will use protocols and signaling conventions suitable for the PSTN, e.g. typically a known circuit switched connection. Occasionally one of the communication units 109, 111 will attempt to initiate a call or communication or may be the intended recipient of a such a call and due to, for example, capacity or resource limitations in the LAN given present network status and call or communication loads the call can not be handled in a normal manner, e.g. with the expected Quality of Service (QoS) levels. Much of the discussions below will be concerned with inventive principles and concepts to resolve or deal with these situations.

Figure 2:
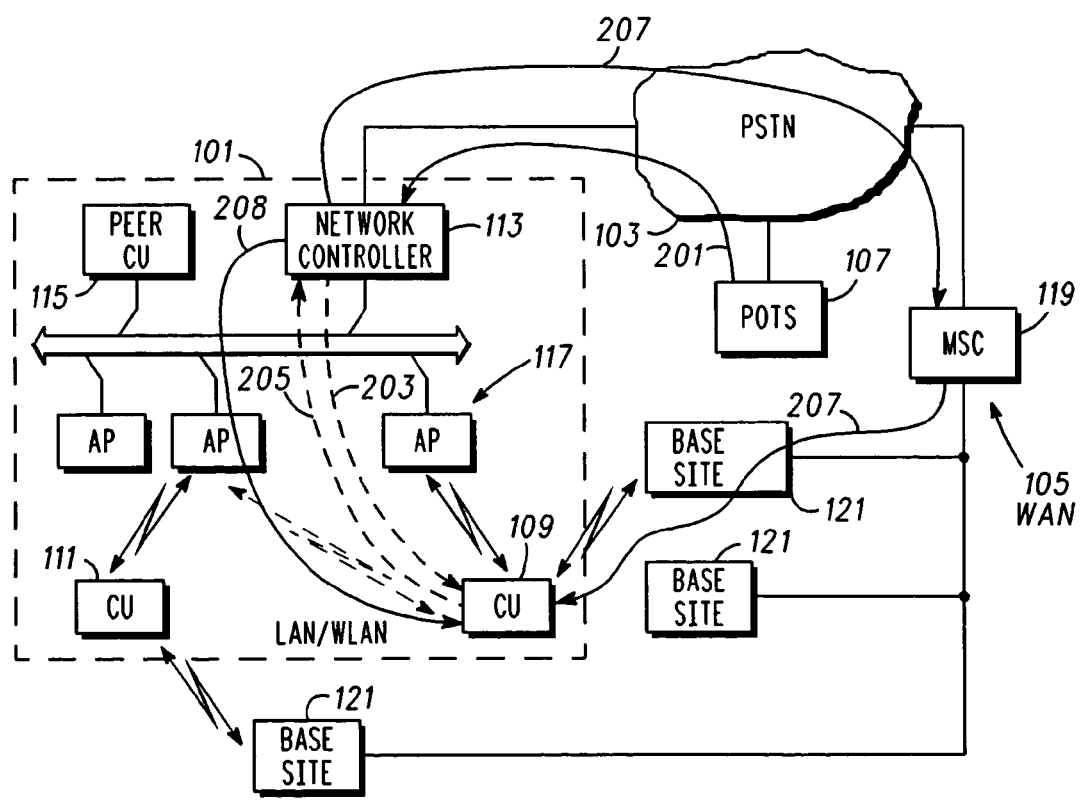
FIG. 2 and FIG. 3 depict various exemplary paths in the routing of the communication or call for the FIG. 1 system.
Figure 3:
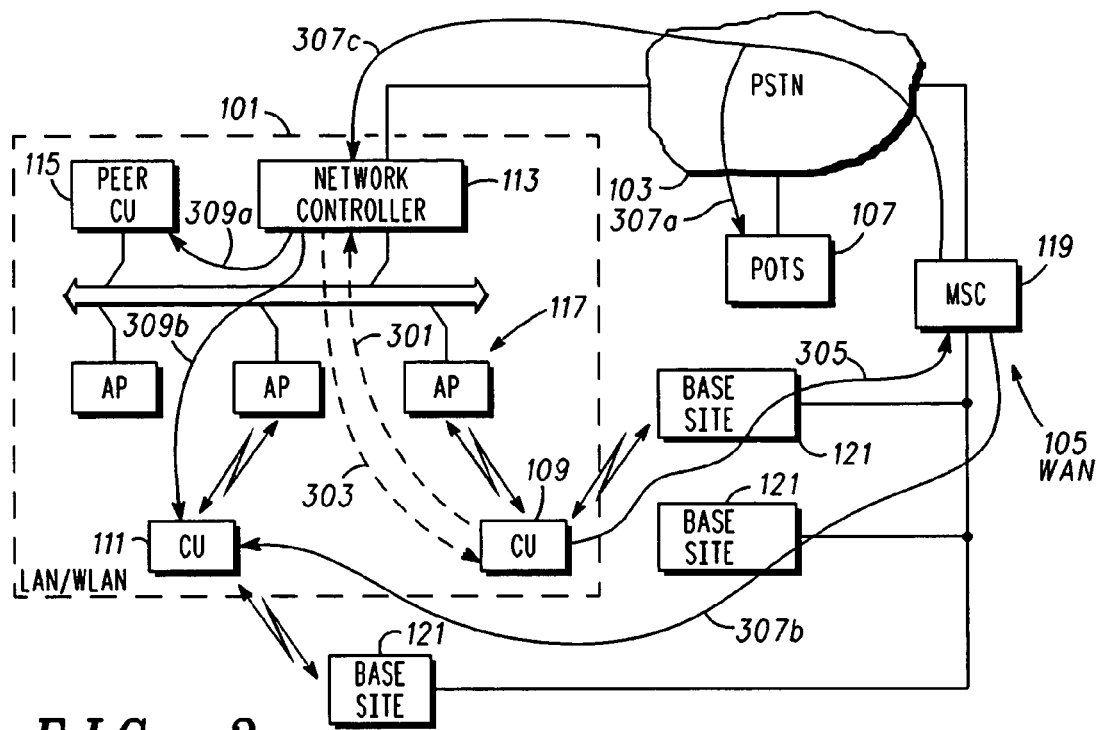

Referring to FIG. 2 and FIG. 3, where like reference numerals refer to like entities, various exemplary states in setting up or routing a call via the LAN and WAN will be discussed and described. FIG. 2 will be referenced to explain various situations that may occur when a call is initiated from another communication unit, such as POTS 107 where the target or intended recipient of the call is a wireless communication unit within the LAN 101, e.g. communications unit 109, 111 or specifically unit 109.

In FIG. 2, POTS 107 (or some other communication unit external to the LAN 101) initiates a call or communication that is addressed to the LAN telephone number or enterprise number, E109, of communication unit (CU) 109. This will be routed by the PSTN to the network controller 113 and is shown as path 201. Normally the network controller 113 using Session Initiation Protocol (SIP) messaging (analogous messaging if other protocols are employed by the LAN, e.g. H.323) sends a SIP INVITE message to and this message is received by CU 109. CU 109 responds to the SIP INVITE and sends a SIP OK message, which the network controller 113 receives. Responsive to the SIP OK the call from the POTS at the network controller is connected from the network controller to the CU 109. Note various other SIP messages may be exchanged for setting up various parameters of the call, for establishing security parameters and the like as will be appreciated by one of ordinary skill. For example the SIP INVITE normally includes a session description protocol (SDP) portion that specifies, among other parameters quality of service (QoS) parameters to be used for the call. These parameters may include a vocoder selection and thus bandwidth requirements, delay and jitter requirements, or the like. These exchanges may be viewed as 203, 205.

However, on some occasions the network controller 113 may not be able to setup the call according to expectations. For example the network controller or other LAN entity, such as a LAN entity that would be in the call leg or bearer leg to CU 109 may not have the capacity needed to support the call or for some reason one or more resources, such as an access point 117, etc. are not available for a bearer leg that will support the call with the proper QoS for the bearer load. One or more of various approaches that may be somewhat situation dependent can be adopted to resolve or deal with these situations where a call is blocked or essentially blocked. For example, the network controller can be configured to forward using known techniques the call to the WAN telephone number, C109, for CU 109. This will result in a bearer path from the network controller 113 through the PSTN 103 to and through the WAN 105 (MSC 119, base site 121, etc) that terminates at the CU 109 as generally depicted by path 207.

Note that setting up the bearer path may include other signaling activities, such as signaling the CU 109 via the LAN that a call is being forwarded to C109, thereby prompting the CU 109 to register with and monitor the WAN for the call. The network controller may inform the CU 109 of the failed call setup and responsive thereto the CU 109 can initiate the call over the WAN. This can be accomplished by instructing the network controller of an alternate path or bearer for the call, e.g. using a SIP 486 message, SIP 302 REDIRECT message or SIP 380 moved temporarily message. For example this can be the path 207 through the WAN or an alternate path 208 through the LAN via a different AP 117 (If coverage is available as shown by dashed line), i.e. CU 109 instructs the network controller to forward the call to C109, i.e. via the WAN, or to a different IP address via the LAN. Note also that the network controller can inform the CU 109 that the call can be supported with a reduced QoS via one or more modifications to the SDP message or portion of the SIP INVITE message. The CU 109 can accept the call with the lowered QoS or reject the lowered QoS and respond with the alternate path SIP 486 message, i.e. initiate a call through the WAN or accept the call via the WAN. The CU 109 may elect to accept the call via the LAN 117 and at a later time instruct the network controller of the alternate path. The extra time may allow the CU to register with the WAN or otherwise prepare (terminate other ongoing LAN calls for example) for a call via the WAN. Note that the signaling from the network controller to the CU 109 and vice versa may be conducted via the paths shown as 203, 205.

In FIG. 3, various examples where the CU 109 attempts to initiate a call are shown in a representative manner and will be discussed and described. Generally the CU attempts to initiate a call 301 by sending a SIP INVITE message to the network controller 113. In one embodiment the network controller blocks the call by sending a message 303, such as a SIP 5XX message (SIP 5XX is a class of message indicating that a call will not be completed). The network controller may also indicate insufficient resource availability and attempt to lower the QoS for the call using a SIP 5XX message and corresponding SDP parameters. The network controller may also respond with a SIP 503 message with a 'retry after' time. In all of the instances the CU may then initiate the call through another bearer leg, e.g. another bearer leg in the LAN (not specifically depicted) or the WAN as shown representatively by 305. Initiating the call via the WAN would normally include registering with the WAN, setting up the call, etc. as is known. If the network controller attempts to lower the QoS the CU can accept the lower QoS, accept it temporarily as noted above with reference to FIG. 2 and then initiate the call via the WAN, or reject it by sending a SIP 606 (not acceptable) message and initiate the call via the WAN. If the network controller sends a 'retry after' time indication the CU can wait and retry or else initiate the call via the WAN.

Note that the target of this call can be the POTS 107 shown by 307a or another CU, such as CU 111 that is capable of operating on the WAN shown by 307b or a communication unit operating on the LAN shown by 307c, where the unit operating on the LAN may be the peer unit as suggested by path 309a or another CU 111 suggested by path 309b. In the latter instance, perhaps the AP or some other entity in the LAN serving the CU 109 may have blocked the call (due to failure or the like), e.g. the CU never receives a SIP OK message or any other message from the network controller. In this case the LAN may be able to support the call using resources other than those normally used to support CU 109 at the present location or AP and thus a call from the WAN may be successfully connected to another unit in the LAN. The CU 109 may also receive a SIP 580 precondition failure message, when for example another CU (such as CU 111) cannot support the QoS. This can occur for example when the AP serving CU 111 does not have sufficient bandwidth or capacity or the like. In this instance the CU 109 would close the session, e.g. SIP BYE, and initiate the call via the WAN.

It is noted that initiating the intended call via the WAN may use techniques similar to a handover of an ongoing call or communication in some instances. A co-pending application Ser. No. 10/674,254, titled HANDOVER METHOD AND APPARATUS, by Belkin et al and assigned to the same assignee as here is hereby incorporated herein in its entirety. The co-pending application discusses various techniques for facilitating such handovers.

Figure 4:
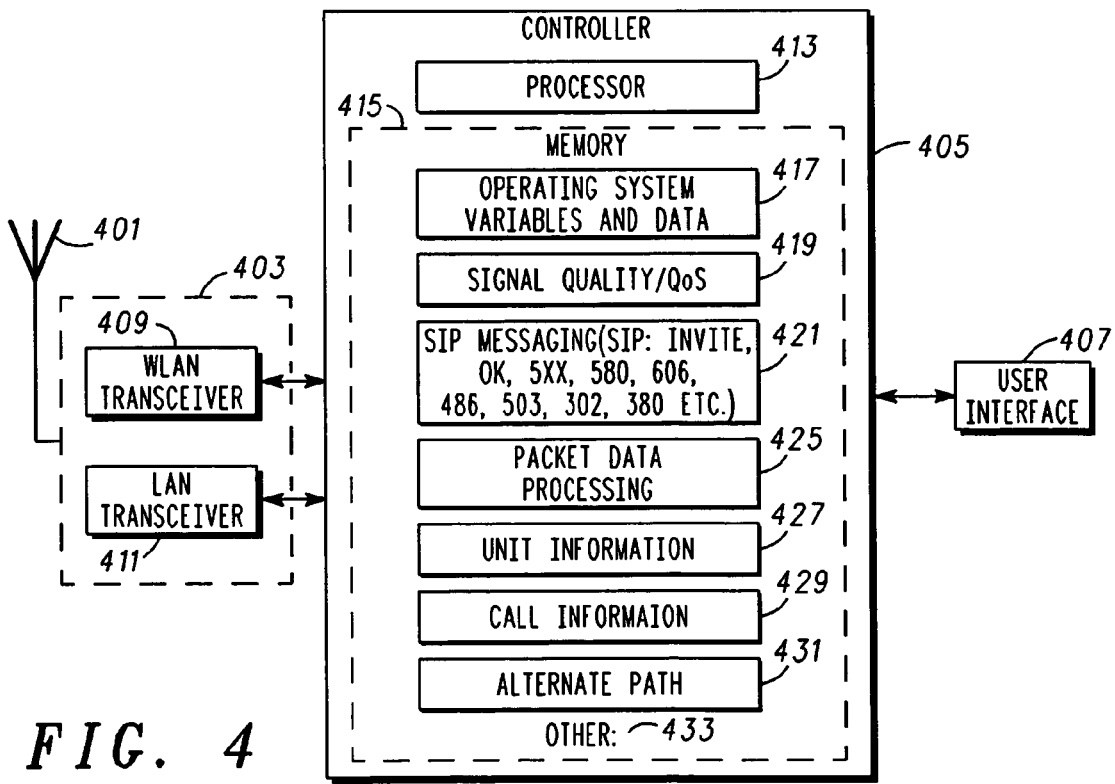
FIG. 4 depicts a simplified block diagram of a wireless communication unit arranged for facilitating call routing for calls from/to the wireless communication unit from one to another wireless communication networks.

Referring to FIG. 4, a simplified block diagram of a wireless communication unit that is arranged for facilitating call routing of a call or communication with the wireless communication unit from a first to a second wireless communication network will be discussed and described. The communication unit is similar to the CUs 109, 111 and is generally known other than the modifications and improvements disclosed herein. Thus the known functions and structure of such devices will not be described in detail other than as related to the inventive principles and concepts disclosed and discussed below. The communication unit of FIG. 4 includes an antenna 401 or antenna structure that operates to couple radio frequency signals between a transceiver 403 and the first or second network, i.e. support an air interface with the LAN or WLAN 101 and WAN 105 as is known. For example, radio signals that are transmitted from the WLAN 101 or WAN 105, such as respectively, by an access point (WLAN transceiver) or base transmitter site (WAN transceiver) are absorbed by the antenna 401 and coupled to a receiver, that is part of the transceiver 403.

Respectively, signals that are amplified by and coupled from the transceiver 403, specifically a transmitter (WLAN transmitter or WAN transmitter), to the antenna 401 are radiated or transmitted or sent to the access point or base transmitter site according to known WLAN technologies, such as 802.11 and others earlier mentioned or WAN technologies, such as known cellular networks. The transceiver 403 may be configurable to support (simultaneously or one at a time) air interfaces with multiple communication networks according to the conventions and protocols of each or may alternatively further include one or more of a WLAN transceiver 409 and WAN transceiver 411 for such purposes as will be appreciated by those of ordinary skill. The transceiver 403 or respective receivers and transmitters are inter coupled as depicted and interactively operate with and are controlled by a controller 405 to provide to, or accept or receive from the controller 405, voice traffic or data messages or signals corresponding thereto in, typically, packet data form.

Accordingly, the transceiver 403, as controlled by and in cooperation with the controller 405 and functions thereof, provide the communication unit with multi or dual operating mode capability. More particularly, the communication unit is capable of registering with and obtaining service from a first and a second communication network, such as a WLAN as well as a cellular network or WAN. For purposes of simplifying this disclosure, the balance of the discussion will refer to only the transceiver 403 and it is understood the transceiver with the controller 405 has the capability to establish and maintain a connection via either of or both the first and the second networks, LAN or WLAN 101 and WAN 105.

The controller 405 is coupled to and generally operates in a known manner with a user interface 407, except for the modifications required according to the principles and concepts discussed here. The user interface 407 is known and typically includes, for example, audio transducers, such as an earphone or speaker and microphone, a display and a keypad. The transceiver and user interface are each inter coupled, as depicted to the controller 405 and the controller provides overall operational command and control for the communication unit.

The controller 405 is essentially a general-purpose processor with supporting functionality (not depicted) and, for example, includes a processor 413 and an associated memory 415. The processor 413 is, for example, a known processor based element with functionality that will depend on the specifics of the air interfaces with the WLAN and the WAN as well as various network protocols for voice and data traffic. The processor 413 will operate to encode and decode voice and data messages to provide signals suitable for the transceiver, a transducer, or further processing by the controller 405. The processor 413 may include one or more generally available microprocessors, digital signal processors, and other integrated circuits depending on the responsibilities of the controller 405 with respect to signal processing duties or other unit features that are not here relevant.

In any event, the controller 405 also includes the memory 415 that may be, for example, a combination of known RAM (Random Access Memory), ROM (Read-Only Memory), EEPROM (Electrically Erasable Programmable ROM) or magnetic memory. The memory 415 is used to store among various other items or programs etc., an operating system or software, data, and variables 417 for execution or use by the processor 413. This operating software 417 when executed by the processor 413 will result in the processor performing the requisite functions of the communication unit 102 such as interfacing with the user interface 407 and transceiver 403 or transmitting and receiving devices. The memory 415 further includes call processing routines not specifically shown for supporting voice and data calls that will be appreciated by one of ordinary skill and that will vary depending on air interface, call processing, and service provider or network specifics.

As depicted, the memory 415 further includes in some embodiments a signal quality and QoS assessment routine 419 for use in determining, for example, whether a call or communication should be routed or re-routed within the LAN, e.g. from AP to AP, or from the LAN to the WAN if the wireless communication unit 102 is responsible for that determination. This routine can request and reserve the resources needed for the call bearer by, for example, using resource reservation protocol (RSVP) constructs such as described in RFC 2210 entitled "The Use of RSVP with Integrated Services." RFC 2210 describes and defines methods and messages whereby an endpoint, such as a CU, can get bandwidth guarantees from the system, e.g. LAN. RSVP uses the "Resv" and "Path" messages to reserve bandwidth. Bandwidth is reserved at the air interface (CU to AP for example) by using the "ADDTS" message which is an acronym for "add TSPEC" and is described in the "Wireless Multimedia Enhancements (WME)", version IEEE 802.11-03-504r7 that was written by the IEEE P802.11 group, as well as the 802.11e specifications. TSPEC is an acronym for "Traffic Specification" and is used by both the IEEE for the layer 2 (WME and 802.11e) reservation and IETF for the layer 3 (RSVP) reservation.

This routine can also assess various QoS parameters, for services such as VoIP calls including jitter or variation from nominal for packet arrival times, delays (combination of queue sizes and throughput to service the queue) and dropped packet information. Dropped calls and corresponding reason codes, such as network controller declines the call, bearer path has stopped, etc. are also collected. For a call using, for example, RTP (real time protocol) for the bearer path or connection and RTCP (real time control protocol) for the corresponding signaling or control path, the various QoS parameters are collected and periodically reported, e.g. at 5 millisecond intervals, to a QoS entity (discussed below with reference to FIG. 5).

In any event this routine may be used to assess one or more QoS parameters and compare those to expected values, e.g. threshold values and depending on the result determine whether re-routing a call or call attempt is appropriate or imminent. The specifics may be communication unit specific and in any event can be experimentally determined and modified as experience dictates. In one embodiment SIP messaging routines 421 are provided for generating and responding to SIP messages according to known techniques. In one embodiment these routines are used to support the air interface with the first and second communication network, initiate calls or call re-routing processes and the like. The SIP messages include for example INVITE (with SDP parameters such as QoS, 200-OK, 5XX—signifying lack of capacity, 580—signifying a precondition failure, 606—signifying not acceptable, 486—used to provide alternate path information, 503—used for specifying a 'retry after' time Additionally, packet data processes 425 are provided for formulating appropriate packets for transport and parsing packets as received according to the specifics of the communication networks and various protocols. Furthermore various data is provided in the memory, specifically unit information 427, including identification information, e.g. serial numbers, phone numbers, and the like to identify the communication unit and call information 429. Collectively this information can be used to identify a particular unit and a particular call, should that information be required. At 431 a handover or alternate path number or identification is located. This handover number or alternate path ID can be obtained at initial configuration or provisioning or assigned by a network entity, such as the network controller or mobility manager portion thereof on a call by call basis. Various other routines 433 that are not particularly relevant to the disclosure or that will be obvious to one of ordinary skill given a specific communication unit will not be discussed.

In operation the wireless communication unit of FIG. 4 is configured to facilitate routing or selective routing of calls, e.g. given an unsuccessful attempt to setup the call on the LAN, the call can be setup on the WAN. Note that the communication unit is operating and given the economics, etc. is biased toward and expected to be operating on the LAN, rather than on the WAN. The communication unit comprises as noted above the transceiver 403 that is suitable to support an air interface with a local area network (LAN) or wireless local area network (WLAN) 101 as well as with a wide area network (WAN) 105. Furthermore, the communication unit includes the controller 405 that is coupled to and controlling the transceiver and configured to determine, for example during a call setup process, that a bearer leg within the WLAN will not support a call over the bearer leg, e.g. at a requested or expected QoS, and responsive to determining that the bearer leg will not support the call, initiate the call (in some embodiments over another bearer leg within the LAN) over the WAN by facilitating routing of the call to or via the WAN. Much of these actions are supported using the SIP messaging routines 421 and packet processing routines 425.

The communication unit (CU), e.g. the controller 405 with the transceiver 403 can determine that the bearer leg will not support the call by or based on receiving a message indicating that the bearer leg will not support the call. This message can take the form of and use a corresponding protocol, such as a RSVP message, a WME message, or a Session Initiation Protocol message or an H.323 message or the like. For example, the controller with the transceiver can be further operable to receive the message comprising a SIP 5XX message (lack of resources or capacity), a precondition failure message (e.g. SIP 580), a call not acceptable message, a message indicating when the call can be retried (SIP 503 message with a time to retry parameter), or a message indicating acceptable parameters for a call that the bearer leg will support (SIP INVITE with SDP parameters indicating lowered QoS).

For example, for an incoming call the network controller may recognize that capacity or resources are not sufficient to support the call and then notify the CU via the WLAN 101 that the call is being forwarded to the WAN number of the CU, e.g. via the WAN 105. The CU thus determines that the bearer leg will not support the call and registers with and accepts the call via the WAN. Alternatively the network controller may notify the CU that the call can not be supported and thus the CU determines that the bearer leg will not support the call and responsive thereto initiates a call by instructing the network controller to forward the call to the WAN, e.g. a SIP 486 message with the WAN as an alternate path, a SIP 302 message redirecting the call to the WAN number for the CU, or a SIP 380 message with appropriate content. As another alternative once the CU has been notified that a call can not be supported, the CU can call a handover or target number or alternate path number or ID via the WAN where the target number terminates at the network controller and allows the incoming call to be connected to the call leg via the WAN and thus the CU.

In yet another alternative, the network controller may notify the CU via a SIP INVITE message with modified SDP parameters indicating acceptable parameters for a call that a bearer leg will support, e.g. lowered QoS. In this instance the CU can accept the call with the lowered QoS or reject the call and send the SIP 486 message with an alternative path as noted above. In the situation where acceptable parameters are indicated, e.g. where the INVITE message indicates a QoS that is lower than normally used for the call, then responsive to receiving this message, the controller with the transceiver can initially accept the call with the lowered QoS, begin registration on the WAN, and then undertake the initiation of the call over the WAN.

In situations where the CU initiates or attempts to initiate the call via the LAN, the network controller or an access point or other entity within the LAN may block the call for lack of capacity, resources, or bandwidth to support a bearer leg for the call. The CU would be notified of this by a SIP 5XX message. If the call is to another CU, such as CU 111 or IP phone, such as peer unit 115 and these units cannot support the requested QoS, the initiating CU will be sent a message, such as a SIP 580 precondition failure message. In these cases, the CU can initiate a call to the intended target unit via the WAN after closing any sessions (SIP BYE), such as to the IP phone, etc. The network controller may attempt to lower the QoS level when the CU attempts to initiate a call and as discussed above the CU can accept (SIP OK) or reject (send a SIP 606 not acceptable message) the lowered QoS or possibly temporarily accept the lowered QoS and act as noted above to later transfer the call to the WAN. When the CU attempts a call the network controller can respond with a message indicating when the call can be retried, e.g. a SIP 503 message with 'retry after' parameter. The CU can retry the call attempt after the prescribed period of time. Alternatively when a lower QoS is proposed or 'retry after' time period is indicated the CU can initiate the call to the intended target unit via the WAN.

Figure 5:
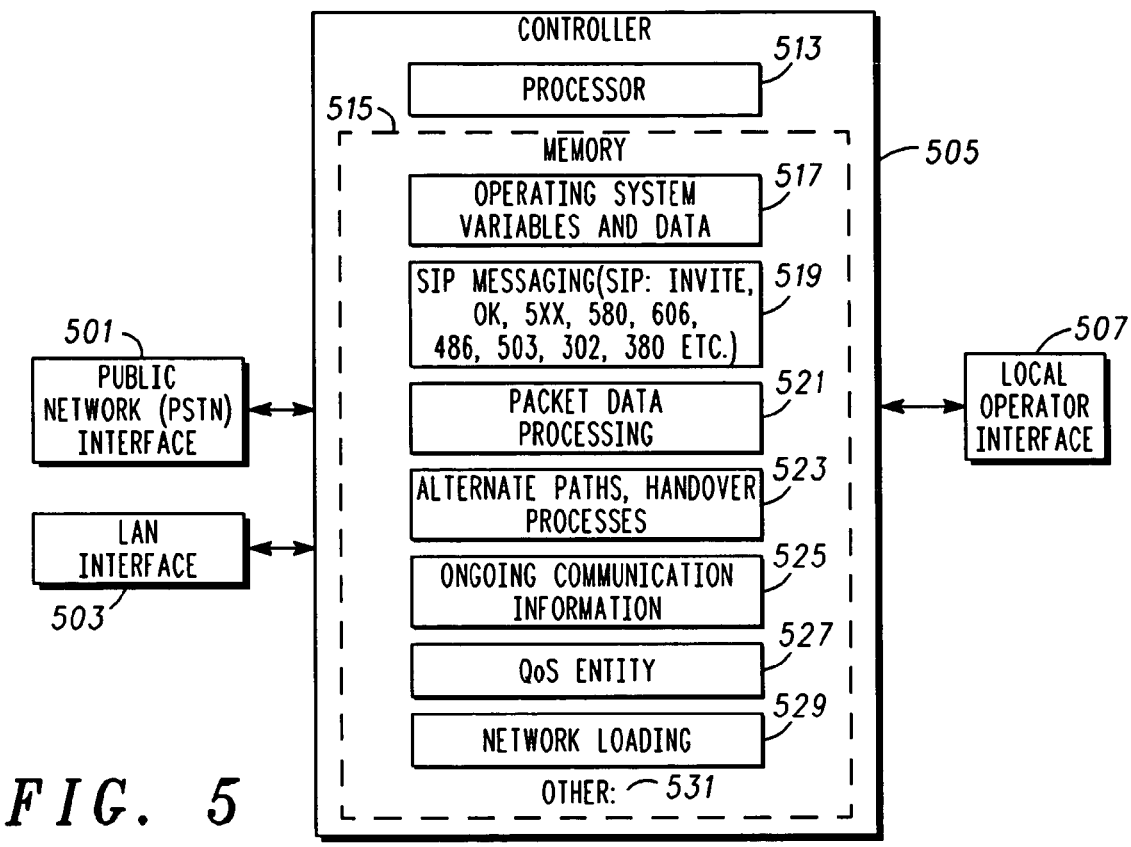
FIG. 5 depicts a simplified block diagram of a network controller usable for facilitating routing of a communication or call.

Referring to FIG. 5, a simplified block diagram of a network controller for a LAN that is usable for facilitating appropriate routing of calls will be reviewed and discussed. Some of this discussion will be in the nature of a review and summary of portions of the discussions above. The block diagram represents in part a general purpose computing platform that embodies a network controller, such as network controller 113. This platform may also include one or more of other generally known SIP network entities, such as a SIP proxy or perhaps a mobility manager. Generally the network controller includes a public network interface, such as PSTN interface 501 for facilitating a known Private Branch Interchange (PBX) interface to the PSTN and requisite call control functions as are generally known. Further included is a network or LAN interface 503, specifically a network interface function, such as a network transceiver. This network or LAN interface can be one or more RJ-45 physical connectors and support an Ethernet protocol, for example.

The PSTN interface 501 and LAN interface 503 are coupled to and controlled by a controller 505 that can be further coupled to a local or remote operator interface 507, such as a monitor and keyboard or another computing platform all as known. The controller includes a processor 513 that is a general purpose processor that may be redundant for incremental network availability. The processor is coupled to a memory 515 that will be some combination of RAM, ROM, EEPROM, and likely magnetic based memory as would be expected on such platforms. Note a suitable platform, server, or computer is available from various manufacturers, including IBM, Dell, and Hewlett Packard, Avaya, for example.

The memory includes an operating system, data, and variables 517 that provide the general operating conditions, instructions, etc, for the processor as is known. In some embodiments, SIP messaging routines 519 are included to facilitate exchanging SIP messages for setting up, defining, and tearing down sessions with the LAN according to known SIP protocols. Additionally packet data processing routines 521 are provided for supporting packet data communication within the network according to the conventions used by the network. In those embodiments where needed. Alternate paths and handover numbers as well as assignments 523 can be provided. The network controller will store ongoing communication or call information 525 that is obtained for any calls that need to be or have been transferred to another network.

The memory is also depicted with a QoS entity 527 that is responsible for collecting and keeping track of QoS statistics as well as quality of experience (QoE) statistics for each element of the network. The elements that are tracked are, for example, switches, routers, APs, communication units, network controller, etc. By tracking QoS & QoE statistics for the elements a good indication of areas of network congestion (load exceeding resources or capacity) can be made available. As noted above the communication units report QoS via RTCP messages. The other elements can either report periodically or be queried by the QoS entity. Statistics that are collected include lost packets, jitter, delays corresponding to any queue at each element, and the like. Typically the protocol used to collect and store these statistics is SNMP (simple network management protocol described in RFC 1215) or RMON (remote monitoring described in RFC 3577). A network loading routine 529 is provided to facilitate determining whether a call or bearer leg for the call can be supported. The loading routine can utilize RSVP, WME, or 802.11 messages as noted above to request and/or reserve resources for the bearer. Alternatively or additionally the loading routine can utilize the statistics and information collected by the QoS entity 527 and determine or predict where the network or LAN is going to be experiencing capacity problems or where calls are being blocked. The QoS entity 527 with the loading routine 529 may collectively and alternatively be referred to as an Element Manager. Additionally many other routines 531 that are not relevant to the present discussions but will be appreciated and understood by those of ordinary skill may be provided.

In operation the network controller of FIG. 5 is for or serves a local area network (LAN) that may be loosely coupled via a PSTN to a wide area network (WAN). The network controller is arranged to facilitate appropriate routing of calls, e.g. call attempts in the LAN that can not be properly supported are setup or routed through the WAN. The network controller comprises as noted above the public switched telephone network (PSTN) interface 501, the LAN interface 503, each intercoupled to the controller 505. The controller 505 is arranged and configured to determine, using generally known network loading routines 429, that a bearer leg in the LAN will not support a call over the bearer leg and responsive to determining that the bearer leg will not support the call, facilitate re-routing the call to the WAN. Note that facilitating the re-routing of the call to or through the WAN can be the result of an active or passive approach on the part of the network controller, e.g. the network controller may initiate the re-routing and notify the appropriate CU or the network controller may wait for instructions from the CU and responsive thereto facilitate the re-routing.

For example, when the call is inbound to the network controller over or via the PSTN interface, the controller is further configured to determine that LAN resources or capacity is not available to support the call over the bearer leg with the initially requested or expected QoS; and responsive thereto send, in cooperation with the LAN interface, a message to a communication unit that is the intended recipient of the call, where the message indicates that the call can not be supported. These messages can be one or more of the messages discussed above in the context of the CU receiving a message. For example, the message can include a lowered Quality of Service (QoS) parameter for the call, e.g. a SIP INVITE with an SDP field that includes a lowered QoS. In this event, the controller 505 in cooperation with the WLAN interface can receive a response message from the communication unit, where the response message indicates an alternate route for the call, e.g. through the WAN. In other embodiments where the message includes a lowered Quality of Service (QoS) parameter for the call, the controller in cooperation with the LAN interface can receive a first response message from the communication unit, the first response message accepting the call with the lowered QoS and thereafter a second response message indicating an alternate route for the call through the WAN thereby initiating the re-routing the call through the WAN.

In other instances where calls are initiated within the LAN, the controller cooperatively with the LAN interface receives a message from a communication unit, the message attempting to initiate the call and then sends, responsive to receiving the message, a response message further indicating at least one of a lack of capacity to support the call, a lower Quality of Service (QoS) to support the call, or a message indicating when the call can be retried. The controller cooperatively with the LAN interface after sending the response message may further receive another message from the communications unit, the other message indicating, for example, an alternate route for the call through the WAN, an acceptance of the call with the lower QoS for the call, or another attempt to initiate the call. It will be appreciated that the above noted functionality and methodology and inventive concepts and principles may be implemented in their entirety within the network controller or may be implemented in a distributed fashion among multiple network entities, such as mobility managers, SIP proxies, and the like.

Figure 6:
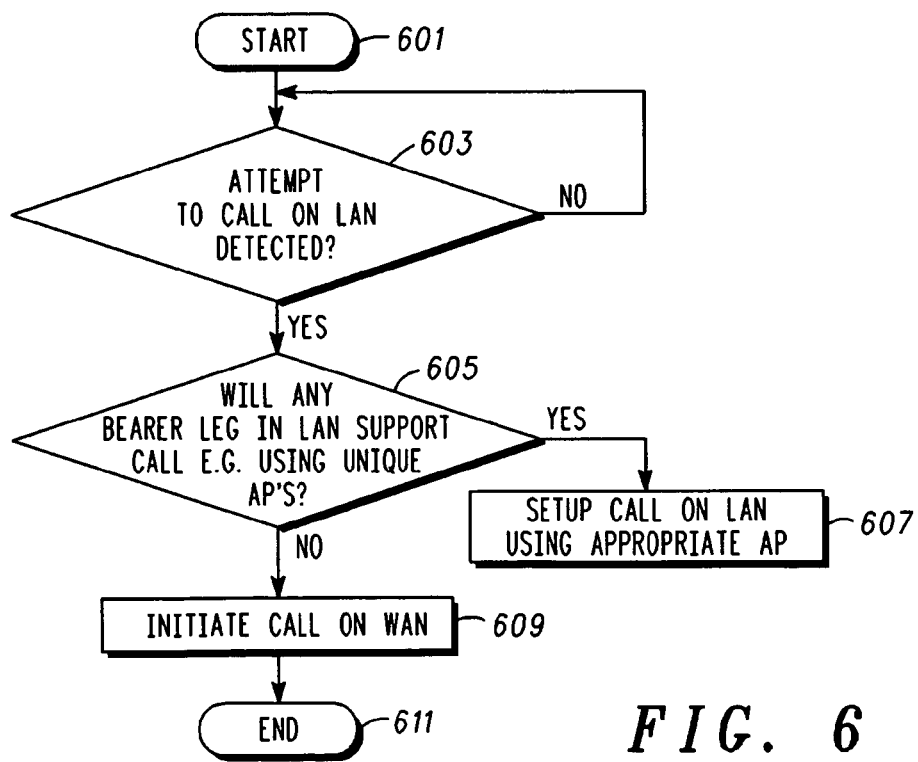
FIG. 6 depict an exemplary method embodiment of selectively routing calls over a WAN.

Referring to FIG. 6, a diagram of an exemplary method embodiment of selectively routing calls, for example, over an alternative bearer path, such as through a WAN or another bearer leg in a LAN will be discussed and described. Much of this discussion may if required reference the above figures and will be provided in an overview form in order to avoid undue duplication of some of the above discussions. As will be appreciated, this method can be practiced by the structures and apparatus described above or by alternative arrangements. For example, much of the method can be advantageously implemented in a communication unit, such as CU 109, 111 or other apparatus with similar functionality. Note that corresponding and complementary processes and methods may also be implemented in the network controller or similar apparatus. The method depicted in FIG. 6 is an approach in a wireless communication unit operating in a local area network (LAN) of selectively routing calls over alternative bearer paths, such as an alternative bearer path within the LAN or a wide area network (WAN).

The method comprises detecting 603 an attempt to initiate a call over the LAN. The CU may make or originate the attempt and thus the detection is straight forward. The network controller or another CU may make the attempt, in which case the CU would detect the attempt via for example a SIP INVITE message or other message from the network controller. If no attempt is detected the process loops as noted. If an attempt is detected, then the method determines 605 whether any bearer leg in the LAN will support the call over the LAN at the appropriate or requested QoS. Alternative bearer legs may be available if more than one access point is within the coverage area of the CU, for example. The CU can use known processes to determine whether alternative APs are available and the CU can take affirmative steps to associate with a different AP and thus route the call via the new AP, e.g. by sending a SIP 302 or redirect message in response to a SIP INVITE message for inbound calls or sending a SIP INVITE messages via the new access point for originated calls. For example, reviewing message contents (lowered QoS) is one example of this determination and additional details will be provided below with reference to FIG. 7. If any bearer leg within the LAN will support the call, the call is setup or initiated over the bearer leg or other bearer leg via the LAN 607 using the appropriate AP. This typically comprises associating with a different AP and sending a contact address to a network controller via, for example, a SIP 302 or SIP 380 messages of the like. The method can be repeated as needed from 603. If it is determined 605 that a bearer leg within the LAN will not support the call over the LAN and no alternative APs and bearers are available in the LAN (607 not performed), the call is initiated over the WAN 609, responsive to the determination at 605. The initiation over the WAN can be embodied as variously noted above. The method ends at 611 but may be repeated as needed.

Figure 7:
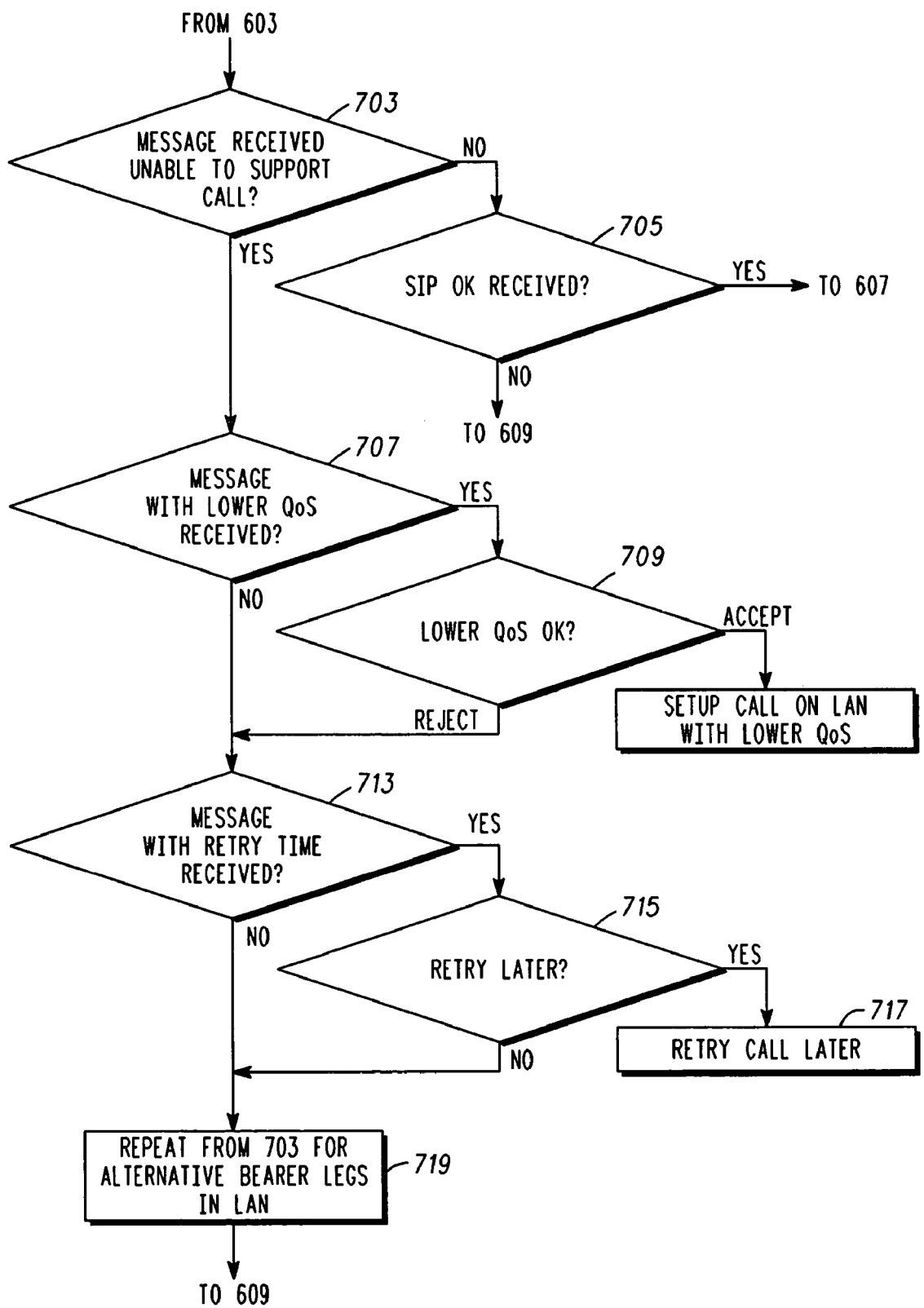
FIG. 7 illustrates a more detailed method embodiment of determining that a call can not be supported by the LAN.

Referring to FIG. 7 a more detailed method of determining whether a bearer leg will support a call will be discussed. FIG. 7 shows a detailed version of an exemplary embodiment of the process 605 of FIG. 6. Note that the messages referred to herein comprise, for example one or more Session Initiation Protocol messages or H.323 messages or the like. The method of FIG. 7 begins as a result of 603 in FIG. 6 and determines whether receiving 703 a message, such as a SIP message discussed above, indicating the bearer leg will not support the call has occurred. If not 705 tests whether a message that was expected, e.g. a SIP OK message, affirming support for the call has been received. If so, the process proceeds to 607 and if not the process proceeds to 609. Note that the message at 703 may comprise one or more of a SIP 5XX message, a precondition failure message, a call not acceptable message, a message indicating when the call can be retried, and a message indicating acceptable parameters for a call that the bearer leg will support. If a message was received 703 suggesting a problem with supporting the call, the method proceeds to 707.

For example the message indicating acceptable parameters for a call may include SDP parameters with a quality of service (QoS) that is lower than the one previously requested, e.g. QoS normally used, for the call and this is tested at 707. If a message indicating lower QoS is received, 709 tests whether the lower QoS is OK and if so 711 shows setting up the call on the LAN with the lower QoS. Note that responsive to receiving the message with lower QoS, the method may further comprise initially accepting the call with the QoS as at 711 and thereafter undertaking the initiating the call over the WAN as at 609 or initiating via a SIP REDIRECT message or the like the call via an alternative AP as at 607 (not specifically depicted). If a message indicating lower QoS is not received at 707 of if the lower QoS is not acceptable at 709, it is determined whether a message including a 'retry after' time has been received at 713. If so 715 determines whether a later retry is OK and if so the call attempt that prompted the later retry indication may be retried 717. If the later retry is not acceptable 715 or if no message with a retry time was received 713 the method proceeds to 719 and the processes of FIG. 7 can optionally be repeated for each alternative bearer path within the LAN. If no other paths are available in the LAN, the method proceeds to 609 in FIG. 6 where the call is initiated or attempted via or over the WAN. Note that initiating the call over the WAN further comprises facilitating a routing of the call to or through the WAN, via for example calling a target number using the WAN, the target number terminating, for example at a controller for the LAN or at another communication unit, such as CU 111 operating on the WAN or POTS 107.

It will be appreciated that the principles and concepts discussed and described above can be used to resolve many situations where a network or portion of a network is experiencing congestion, some abnormality, or may be overloaded under the circumstances. For example, if one access point 117 that is being used by a CU is overloaded or having some difficulty supporting an offered load or an attempted call, a CU or the like can take affirmative steps, e.g. a SIP 302 (Redirect) message, to utilize another access point if another access point is available, e.g. within coverage. For example a wireless communication unit or network controller can be configured to facilitate routing calls within the LAN based on for example QoS parameters, such as bandwidth available (e.g. type of vocoder requested or available for example), dropped packets, jitter, path delays, and dropped call statistics. The wireless communication unit would include, for example, a transceiver suitable to support an air interface with a wireless local area network (WLAN) via multiple access points and possibly with a wide area network (WAN) as well as a controller coupled to and controlling the transceiver and configured to: determine (based on one or more QoS parameters) that a first bearer leg, for example via a first access point within the WLAN, will or is not properly supporting a call over the first bearer leg and responsive thereto proactively initiate the call over a second and different bearer leg that offers a higher or better QoS. Note that this decision is made on the basis of one or more QoS parameters rather than traditional signal quality assessments.

This disclosure is intended to explain how to fashion and use various embodiments in accordance with the invention rather than to limit the true, intended, and fair scope and spirit thereof. The invention is defined solely by the appended claims, as they may be amended during the pendency of this application for patent, and all equivalents thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A wireless communication unit configured to facilitate routing calls, the communication unit comprising:
   a transceiver suitable to support an air interface with a wireless local area network (WLAN) and with a wide area network (WAN); and
   a controller coupled to and controlling the transceiver and configured to:
   determine a requested Quality of Service (QoS) from a call set up message;
   determine from a message received during a call setup process for the call that a bearer leg within the WLAN will not support the call over the bearer leg at the requested QoS wherein the message indicates that the bearer leg will not support the message at the requested QoS; and
   responsive to determining that the bearer leg will not support the call over the bearer leg, initiate the call over the WAN.

2. The wireless communication unit of claim 1, wherein the controller with the transceiver is further operable to receive the message comprising at least one of: a SIP 5XX message, a precondition failure message, a call not acceptable message, a message indicating when the call can be retried, and a message indicating acceptable parameters for a call that the bearer leg will support.

3. The wireless communication unit of claim 2, wherein the message comprises one of a Session Initiation Protocol message and an H.323 message.

4. The wireless communication unit of claim 2 wherein the message indicating acceptable parameters for a call includes a quality of service (QoS) that is lower than normally used for the call and responsive to receiving this message, the controller with the transceiver initially accepts the call with the QoS, begins registration on the WAN, and then undertakes the initiate the call over the WAN.

5. The wireless communication unit of claim 1, wherein the controller with the transceiver is configured to initiate the call over the WAN by facilitating a routing of the call to the WAN.

6. The wireless communication unit of claim 5, wherein the controller with the transceiver is configured to facilitate the routing of the call to the WAN by at least one of calling a target number terminating on a network controller using the WAN and sending a contact address to the network controller.

7. A method in a wireless communication unit operating in a local area network (LAN) of selectively routing calls over alternative bearer paths, the method comprising:
   detecting an attempt to initiate a call over the LAN;
   determining a requested Quality of Service (QoS) from a call setup message for the call;
   determining from a received message that a bearer leg within the LAN will not support the call over the LAN at the requested QoS; and
   initiating the call over an other bearer leg via a WAN, responsive to determining that the bearer leg will not support the call at the requested QoS.

8. The method of claim 7, wherein the message further comprises at least one of a SIP 5XX message, a precondition failure message, a call not acceptable message, a message indicating when the call can be retried, and a message indicating acceptable parameters for a call that the bearer leg will support.

9. The method of claim 7, wherein the message comprises one of a Session Initiation Protocol message and an H.323 message.

10. The method of claim 8 wherein the message indicating acceptable parameters for a call includes a quality of service (QoS) that is lower than normally used for the call and responsive to receiving this message, the method further comprises initially accepting the call with the QoS and thereafter undertaking the initiating the call over the other bearer leg routed via the WAN.

11. The method of claim 7, wherein the initiating the call over the other bearer leg further comprises at least one of initiating the call over at least one of another LAN bearer leg and facilitating a routing of the call through the WAN.

12. The method of claim 11, wherein the facilitating the routing of the call through the WAN further comprises calling a target number using the WAN, the target number terminating at a controller for the LAN and wherein the initiating the call over another LAN bearer leg further comprises associating with a different access point and sending a contact address to a network controller.

* * * * *